United States Patent [19]

Noe

[11] Patent Number: 4,696,799
[45] Date of Patent: Sep. 29, 1987

[54] AMMONIA SYNTHESIS CONVERTER

[75] Inventor: Stephen A. Noe, Houston, Tex.

[73] Assignee: The M. W. Kellogg Company, Houston, Tex.

[21] Appl. No.: 885,620

[22] Filed: Jul. 15, 1986

[51] Int. Cl.$^4$ ............................................. C01C 1/04
[52] U.S. Cl. .................................. 422/148; 422/190; 422/193; 422/203; 423/360; 423/361
[58] Field of Search ............... 422/148, 190, 193, 203; 423/360, 361

[56] References Cited

U.S. PATENT DOCUMENTS

| | | |
|---|---|---|
| 2,898,183 | 8/1959 | Fauser . |
| 3,395,982 | 8/1968 | Didycz . |
| 3,567,404 | 3/1971 | Axelrod et al. . |
| 3,892,535 | 7/1975 | Hennel et al. . |
| 4,452,760 | 6/1984 | Peterson et al. ................. 422/148 |

OTHER PUBLICATIONS

Strelzoff, "Technology and Manufacture of Ammonia", Wiley and Sons, 1981, pp. 19–37.

Primary Examiner—Barry S. Richman
Assistant Examiner—William R. Johnson

[57] ABSTRACT

A horizontal, cold wall, multi-bed ammonia converter having two, shell and tube interchangers for cooling reaction gas streams leaving respectively the first and second catalyst beds with incoming reactant gases wherein each of the interchangers is vertically oriented and physically located between catalyst beds. The catalyst beds are adiabatic, slab-shape beds defined in part by side portions of the inner wall of the converter and are arranged for downward, transverse flow of reacting gases. Longitudinal conduits and baffling in cooperation with the arrangement of catalyst beds and interchangers provide serial flow of gas through the cold side of each of the interchangers, a first catalyst bed, the hot side of one of the interchangers, a second catalyst bed, the hot side of the other interchanger, a third catalyst bed, and, optionally, a fourth catalyst bed.

3 Claims, 4 Drawing Figures

AMMONIA SYNTHESIS CONVERTER

This invention relates to horizontal converters for exothermic, catalytic synthesis of ammonia from hydrogen and nitrogen. The synthesis is well known and is typically conducted at pressures within the range from about 70 to about 325 bars and temperatures within the range from about 340° C. to about 525° C.

A single converter is generally employed in modern, large capacity ammonia plants. In a 1000 metric ton per day plant, the catalyst volume will range from about 40 to about 90 m$^3$ and be contained in a converter having a diameter from about 2 to about 4 m and length or height from about 10 to about 35 m. Catalyst beds within the converter may be arranged for transverse flow, radial flow, or axial flow of gas. Transverse flow converters are quite common and usually employ a cold wall, double shell design which provides a shell annulus for passage of cooling gas adjacent the outside pressure shell. The converter of the present invention is a cold wall, transverse or "slab" flow converter.

It is not feasible to contain the entire catalyst volume in a single catalyst bed because of reaction equilibrium considerations and the possibility of catalyst overheating and damage. It has, therefore, been common practice to arrange the catalyst in multiple beds with provision for interbed or intrabed cooling.

Customarily, this cooling is provided by interbed injection of cool synthesis gas for direct heat exchange with partially converted gas (i.e. - a direct quench converter or some combination of direct gas quench with interbed heat exchangers of the shell and tube type). Converter designs which emphasize direct quench tend to be less costly than combination designs since fewer, smaller, shell and tube exchangers are employed according to the volume of quench gas introduced. Plants employing these designs do, however, suffer the penality of higher synthesis gas compression costs since the totality of synthesis gas to the converter does not contact the totality of the catalyst therein. Therefore, more gas must be circulated to obtain a given amount of ammonia product.

From the foregoing, it may be appreciated that ammonia converters are large, complex items of equipment and that steps toward more efficient, less costly design are needed.

According to the invention a horizontal, cold wall, multiple bed converter having two heat exchangers is provided. The transverse flow catalyst beds are arranged longitudinally within the cylindrical inner shell of the converter with the first heat exchanger disposed vertically between the first and second catalyst beds and the second heat exchanger disposed vertically between the second and third catalyst beds. Gas flows in series through a gas inlet at one end of the converter, the shell annulus, the cold, tube sides of the second, then the first heat exchangers, the first catalyst bed located at the opposite end of the converter, the hot side of the first heat exchanger, the second catalyst bed disposed between the two exchangers, the hot side of the second heat exchanger, the third and, usually, fourth catalyst beds, and finally a gas outlet proximate the final catalyst bed and located at the same end of the converter as the gas inlet.

The converter of the invention employs no external quench gas between or within the catalyst beds. That is to say, the hot, shell sides of the heat exchangers are in exclusive flow communication with their respective upstream and downstream catalyst beds. Accordingly, all of the converter outlet gas passes initially through the first catalyst bed.

Figure 1:
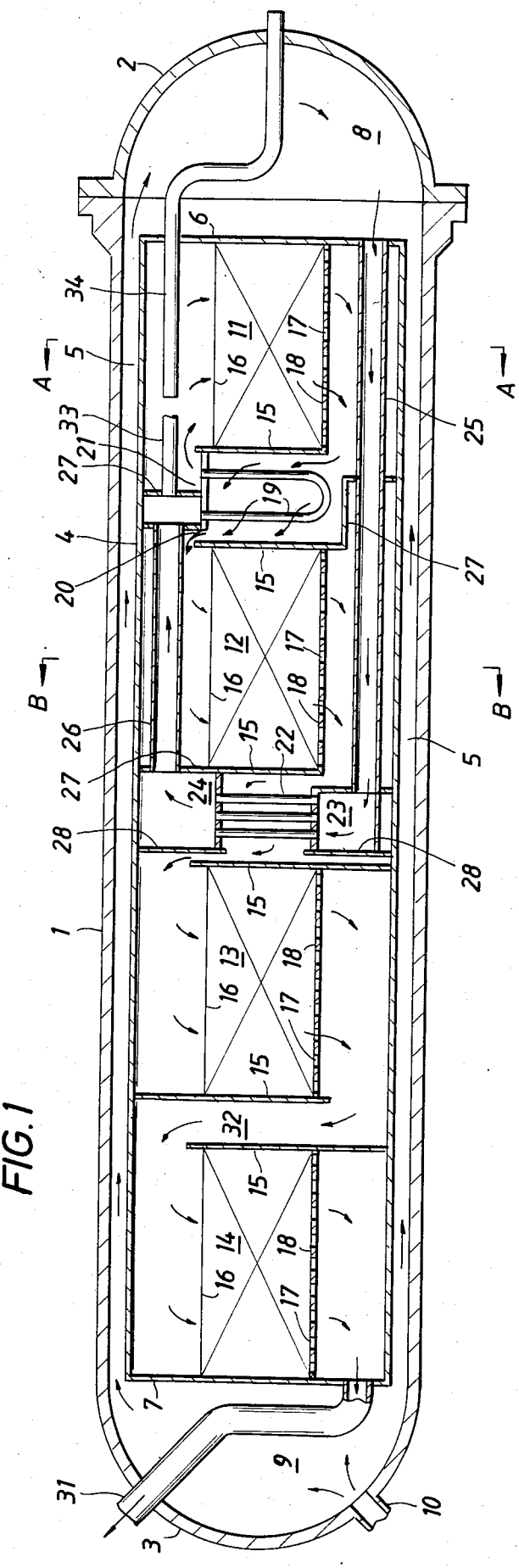
FIG. 1 is a preferred embodiment of the invention in which the horizontal converter employs a single-pass heat exchanger between the second and third catalyst beds.
Figure 3B:
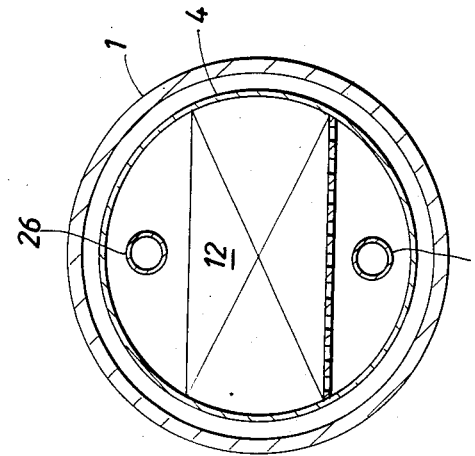
FIG. 3 shows cross-sections of the converter illustrated in FIG. 1 at A—A and BB.
Figure 3A:
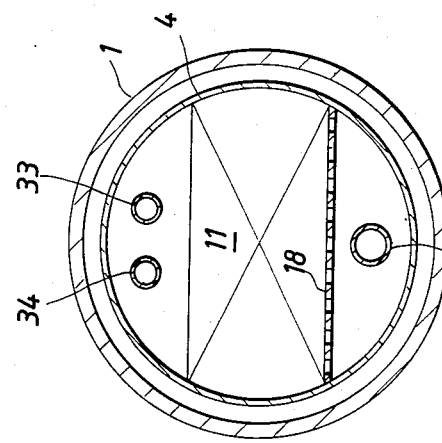
Figure 2:
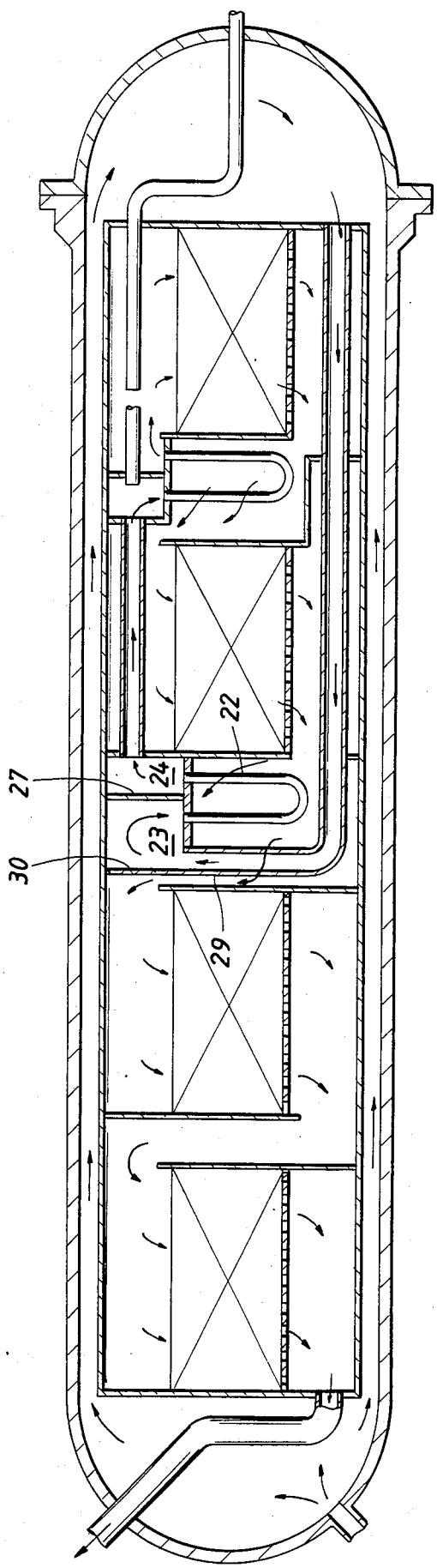
FIG. 2 is another embodiment of the invention wherein a U-tube exchanger is employed between the second and third catalyst beds.

Referring to FIGS. 1 and 2, the horizontal converter is contained within cylindrical pressure shell 1 which is attached to first end outer head 2 shown at the right-hand side of the drawing and second end outer head 3 shown at the left-hand side of the drawing. A cylindrical inner shell 4 is disposed within and parallel to the pressure shell and extends substantially through the entire length thereof to form shell annulus 5. First end closure 6 and second end closure 7 are attached to ends of the inner shell and form first gas plenum 8 and second gas plenum 9, respectively. Gas inlet 10 is mounted in second end outer head 3 so that relatively cool ammonia synthesis gas entering the inlet flow freely into the second gas plenum 9, shell annulus 5, and then to the first gas plenum 8.

First, second, third, and fourth adiabatic catalyst beds 11, 12, 13, and 14 are contained within the inner shell in such manner that opposed side portions of the inner shell define the lateral extremities of the beds. The beds are longitudinally defined by transverse partitions 15 which, as indicated in the drawings, have openings for passage of gas. End closures 6 and 7 are conveniently employed as end partitions for catalyst beds 11 and 14. Each of the catalyst beds has a top inlet portion 16 and a bottom outlet portion 17, the catalyst particles being supported by grids 18 and screens not shown. The catalyst beds are, therefore, arranged for downward flow of gas in a path substantially normal to the axis of the converter in what is commonly referred to as "slab-flow".

A first tubular heat exchanger 19 having tube inlet portion 20 and tube outlet portion 21 is located between first catalyst bed 11 and second catalyst bed 12. Since synthesis gas entering the first catalyst bed contains little ammonia, conversion to ammonia with accompanying gas temperature rise is greater here than in the downstream catalyst beds. In order to provide the large heat exchange duty required for cooling gases leaving the first bed prior to their entry to the second bed, the first exchanger 19 employs vertical U-tubes which provide high internal tube gas velocity and, therefore, high heat transfer rates which thereby minimize the size of this exchanger.

A second tubular heat exchanger 22 having tube inlet portion 23 and tube outlet portion 24 is located between second catalyst bed 12 and third catalyst bed 13. This exchanger may also be a vertical U-tube exchanger as shown in FIG. 2 but, since less heat transfer duty is required, is preferably a single-pass, vertical tube exchanger as shown in FIG. 1. Use of a single-pass exchanger minimizes the pressure drop.

The flow path through the first and second catalyst beds and first and second exchangers is provided by longitudinal conduits within the cylindrical inner shell 4 above and below the catalyst beds. First longitudinal conduit 25 is located below both beds 11 and 12 and connects first gas plenum 8 with tube inlet portion 23 of second heat exchanger 22 where initial preheating of synthesis gas takes place in the tube side of the exchanger. Initially preheated gas then flows through second longitudinal conduit 26 located above bed 12 to tube inlet portion 20 of first heat exchanger 19 for final preheating. Fully preheated gas then flows from tube outlet portion 21 of the first heat exchanger to the top inlet portion of the first catalyst bed 11.

As may be seen from the drawings, the alternating arrrangement of catalyst bed and interchangers is quite easily adapted to gas flow characterized by low pressure drop through suitable baffling indicated generally by 27. These baffles as well as the partitions of the catalyst beds provide means for conducting gas successively from the tube outlet portion 21 of the first heat exchanger downwardly through first catalyst bed 11 across tube exteriors of the first heat exchanger, downwardly through second catalyst bed 12, and then across tube exteriors of second heat exchanger 22. In FIG. 1, gas flowing across tube exteriors of heat exchanger 22 passes through an opening in central partition 28 and then flows upwardly through the channel formed by adjacent transverse partition 15 and into top inlet portion 16 of catalyst bed 13. Since the converter of FIG. 2 employs vertical, U-tube exchangers, first longitudinal conduit 25 is then extended by vertical conduit 29 to convey gas to the tube inlet portion 23 of the second heat exchanger which, in this instance, is a gas plenum formed by chord-shaped baffle 30 and adjacent baffle 27. In FIG. 2, all other reference numerals are the same as for in FIG. 1.

Since gas flowing between catalyst beds 13 and 14 is not cooled, it is apparent from a process viewpoint that these constitute a single adiabatic conversion zone which may be physically embodied in one, two, or possibly three beds according to relevant process design parameters such as overall converter pressure drop and extent of conversion. In the embodiment of the invention shown in the drawings, the means for conducting gas from the bottom outlet portion of third catalyst bed 13 to gas outlet 31 located in second outer head 3 includes fourth catalyst bed 14 at the second end of the converter. The third and fourth beds are spaced apart by gas channel 32 formed by adjacent transverse partitions 15 of the third and fourth beds.

As previously indicated, the converter of the invention does not employ interbed quenching to cool partially converted gas. Cool synthesis gas is, however, optionally introduced to tube inlet and outlet portions 20 and 21 by respective by-pass pipes 33 and 34 in order to provide close temperature control over the gas entering the first and second catalyst beds.

I claim:

1. A horizontal ammonia converter having a first end and a second end which comprises:

(a) a cylindrical pressure shell having outer heads contiguous therewith at the first and secodn ends;

(b) a cylindrical inner shell disposed within substantially the entire length of the pressure shell and defining a shell annulus therewith, the inner shell having first and second end closures contiguous with the cylindrical inner shell, the first end outer head defining a first gas plenum with the first end closure and the second end outer head defining a second gas plenum with the second end closure;

(c) gas inlet means disposed in the second end outer head in serial fluid communication with the second gas plenum, the shell annulus, and the first gas plenum;

(d) gas outlet means;

(e) first, second, and third, slab-flow catalyst beds defined by transverse bulkheads within the inner shell and opposed side portions of the inner shell, the first catalyst bed being proximate the first end of the converter and the second catalyst bed being spaced between the first and third catalyst beds, each of the catalyst beds having a top inlet face and a bottom outlet face;

(f) a first heat exchanger having an upper end and vertical U-tubes with inlet and outlet means at the upper end of the exchanger, the first heat exchanger being disposed between the first and second catalyst beds;

(g) a second heat exchanger having vertical tubes with inlet and outlet means, the second heat exchanger being disposed between the second and third catalyst beds;

(h) first longitudinal conduit means disposed within the cylindrical inner shell below and externally proximate to the first and second catalyst beds providing fluid communication between the first gas plenum and the inlet means of the second heat exchanger;

(i) second longitudinal conduit means disposed within the cylindrical inner shell above and externally proximate to only the second catalyst bed providing fluid communication between the outlet means of the second heat exchanger and the inlet means of the first heat exchanger;

(j) baffle means for conducting gas successively from the outlet means of the first heat exchanger downwardly through the first catalyst bed, across tube exteriors of the first heat exchanger, downwardly through the second catalyst bed, across tube exteriors of the second heat exchanger and downwardly through the third catalyst bed; and (k) means for conducting gas from the bottom outlet face of the third catalyst bed to the gas outlet means.

2. The converter of claim 1 wherein the means for conducting gas from the bottom outlet face of the third catalyst bed includes a fourth slab-flow catalyst bed.

3. The converter of either claim 1 or claim 2 wherein the second heat exchanger has single-pass tubes.

* * * * *